(12) United States Patent
Yoon

(10) Patent No.: US 8,929,836 B2
(45) Date of Patent: Jan. 6, 2015

(54) ZIGBEE DEVICE AND METHOD FOR MANAGEMENT OF ZIGBEE DEVICE

(75) Inventor: Dae Gil Yoon, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 177 days.

(21) Appl. No.: 13/606,316

(22) Filed: Sep. 7, 2012

(65) Prior Publication Data

US 2013/0084811 A1    Apr. 4, 2013

(30) Foreign Application Priority Data

Sep. 30, 2011    (KR) .................. 10-2011-0100218

(51) Int. Cl.
*H04B 1/38*      (2006.01)
*H04W 80/04*     (2009.01)
*H04L 29/06*     (2006.01)
*H04L 12/835*    (2013.01)

(52) U.S. Cl.
CPC ............. *H04W 80/045* (2013.01); *H04L 69/16* (2013.01); *H04L 47/30* (2013.01)
USPC ........... 455/73; 455/41.1; 455/41.2; 455/514; 711/103; 711/112; 711/114; 711/168

(58) Field of Classification Search
CPC ...... H04W 80/045; H04L 69/16; H04L 47/30
USPC .......... 455/41.1, 41.2, 514, 73; 711/103, 112, 711/114, 168, 149, 170
See application file for complete search history.

(56) References Cited

U.S. PATENT DOCUMENTS

| | | | |
|---|---|---|---|
| 2005/0021830 A1* | 1/2005 | Urzaiz et al. | 709/234 |
| 2007/0298885 A1* | 12/2007 | Tran | 463/37 |
| 2010/0085165 A1* | 4/2010 | Villa et al. | 340/10.51 |

FOREIGN PATENT DOCUMENTS

| | | |
|---|---|---|
| JP | 2005-269632 | 9/2005 |
| KR | 10-2007-0057587 | 6/2007 |
| KR | 20-2010-0011155 | 11/2010 |

OTHER PUBLICATIONS

Korean Office Action issued Jul. 1, 2014 in corresponding Korean Patent Application No. 10-2011-0100218.

* cited by examiner

*Primary Examiner* — Tuan Pham

(57) ABSTRACT

The present invention is related to a Zigbee device and a method for management of a Zigbee device. The Zigbee device is capable of improving data processing efficiency as well as improving resource utilization by estimating a future available buffer amount of a buffer unit and controlling a variable buffer amount in such a way that the available buffer amount of the buffer unit is matched to the future available buffer amount.

17 Claims, 6 Drawing Sheets

- PRIOR ART -

- PRIOR ART -

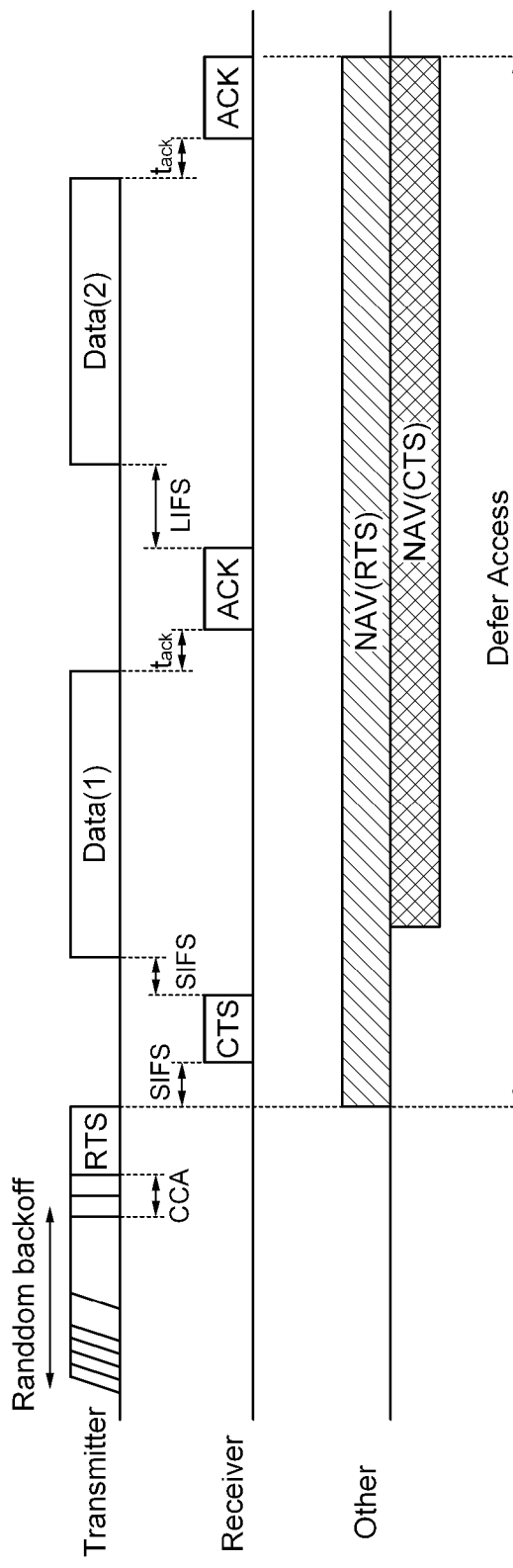

FIG. 9
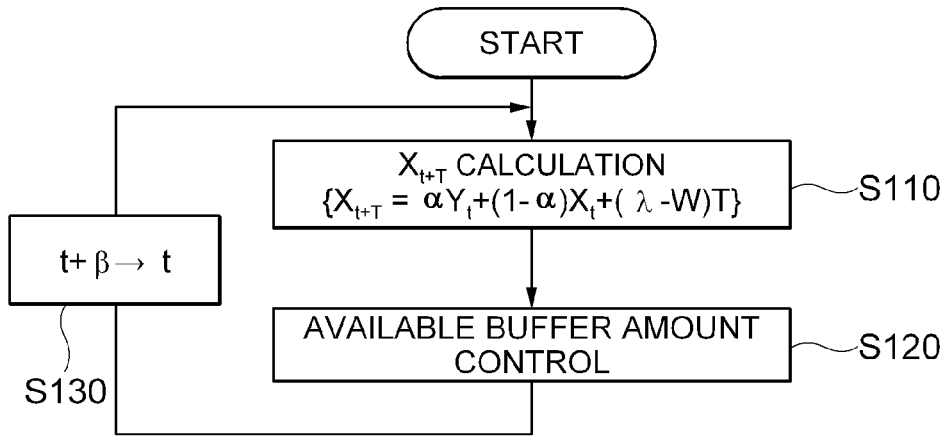
[FIG. 10]
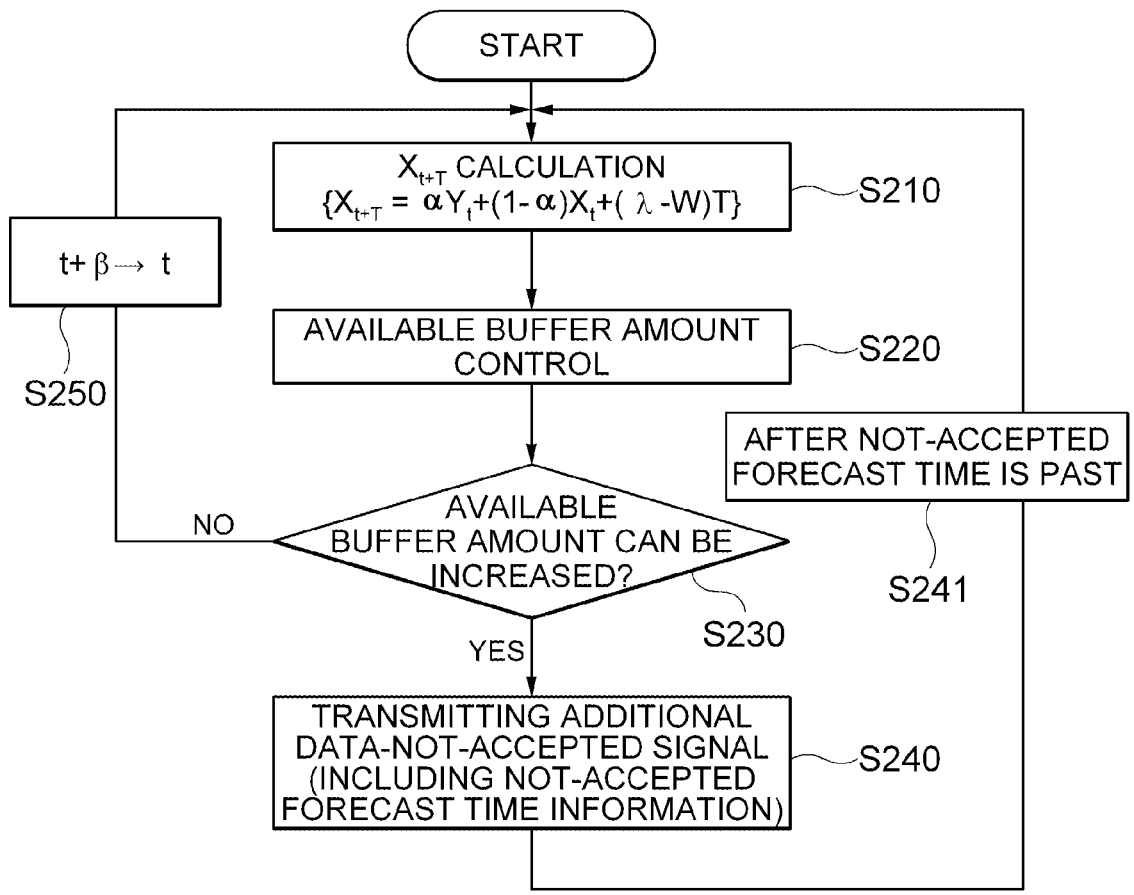

ZIGBEE DEVICE AND METHOD FOR MANAGEMENT OF ZIGBEE DEVICE

CROSS-REFERENCE TO RELATED APPLICATIONS

This application claims the benefit under 35 U.S.C. Section 119 of Korean Patent Application Serial No. 10-2011-0100218, filed Sep. 30, 2011, which is hereby incorporated by reference in its entirety into this application.

BACKGROUND OF THE INVENTION

1. Field of the Invention

The present invention relates to a Zigbee device and a method for management of a Zigbee device.

2. Description of the Related Art

Recently, various types of wireless communications have be utilized everywhere in real life due to the development of communication technology.

Such wireless communication technologies have been established as global standards in various types such as a mobile phone, a wireless lan, a Bluetooth, a Zigbee or the like and they are used in optimum fields respectively according to features.

Herein, the Zigbee means one of IEEE 802.15.4 standards to support a near field communication and it is used in various fields such as an intelligent home network, a near field communication market for buildings, an industrial automation, logistics, environment monitoring, an human interface, telematics, military fields or the like.

Since Zigbee networks have devices being relatively small, the power consumption thereof is low and the manufacturing cost of the devices used in Zigbee networking is cheap in comparison with the other network methods, they have been in the spotlight recently as Ubiquitous construction solutions such as a home network.

On the other hand, as interests for smart energy 2.0 have been increased, the smart energy 2.0 is implemented through a protocol as a Zigbee IP stack as shown in FIG. 1.

Referring to FIG. 1, a link layer plays roles of discovering PANs(Personal Area Networks) within a communication range and transmitting a data frame consisting of a payload of maximum approximately 100 bytes.

An adaptation layer plays roles of performing compression and depression and performing fragmentation and reassembly of IPv6 packet exceeding the maximum payload of the link layer frame.

A network layer performs the functions of routing, IPv6 addressing and packet forming.

On the other hand, since a MTU(Maximum Transmission Unit) is 1280 bytes, it is transceived by performing fragmentation into the maximum 102 bytes, therefore, there is required for a buffer in order to process this.

FIG. 2 is an exemplary diagram schematically showing a flow to process a data frame in the Zigbee IP stack.

Referring to FIG. 2, a source node requires a transmission buffer of minimum 1,280 bytes in order that the source node transmits a frame of 1,280 bytes to a destination node and the destination node requires a transmission buffer of minimum 1,280 bytes in order to process by receiving this. And also, a medium router requires a buffer having an approximate size in order to relay this.

On the other hand, although there is no problem if another frame is received under the condition that the buffer is empty by allowing the received data frame to be processed in such procedure, there is frequently occurred that another received data frame is stored in the buffer before the received data frame is processed.

As FIG. 3 is an exemplary view schematically showing a Zigbee IP network, referring to FIG. 3, in case when a plurality of routers 20 or hosts continuously transmit data frames to one edge router, the data which is larger than an amount of data capable of being processed by the edge router to receive this may be received, in this result, there may occur a frame drop phenomenon since the buffer is fully occupied.

Of course, although the above-described problem is overcome by increasing a basic buffer size, but in this case there is a problem to raise a manufacturing cost.

On the other hand, in the patent reference 1, there is disclosed a method to avoid a local congestion in a wireless personal region network, the invention disclosed in the patent reference 1 is a major object to perform a congestion control by using a reserved field, although it can additionally prevent a bottleneck phenomenon which the buffering of node is overflow, but there is a limit that a fundamental solution is not still found to solve a deficiency state of buffers to be predicted as being frequently generated in the smart energy 2.0 or the like.

PRIOR ART TECHNICAL REFERENCE

Patent reference

Patent reference 1: KR published patent document No. 10-2005-0117218

SUMMARY OF THE INVENTION

The present invention has been invented in order to overcome the above-described problems and it is, therefore, an object of the present invention to provide a Zigbee device and a method for management of a Zigbee device capable of varying a buffer amount by estimating a required buffer amount.

And also, it is another object of the present invention to provide a Zigbee device and a method for management of a Zigbee device capable of preventing a frame drop phenomenon by alarming a limitation of variable capacity to another Zigbee device, even when reaching the limitation of variable capacity.

In accordance with one aspect of the present invention to achieve the object, there is provided a Zigbee device including: a transceiver unit for transceiving data; a memory unit for storing the data; a buffer unit, which is one region of the memory unit, for storing the data to be transmitted or the data to be received; and a control unit for estimating a future available buffer amount of the buffer unit and controlling an available buffer amount in such a way that the available buffer amount of the buffer unit is matched to the future available buffer amount.

At this time, the control unit includes: a calculation unit for estimating the future available buffer amount; and a buffer amount control unit for controlling the variable buffer amount in such a way that the available buffer amount of the buffer unit is matched to the future available buffer amount.

And also, the calculation unit calculates the future available buffer amount estimation value by using a following equation 1, $$X_{t+T} = \alpha Y_t + (1-\alpha) X_t \qquad \text{Equation 1,}$$

when the $Y_t$ is a real variable buffer amount at t as a current time, the $X_{t+T}$ is a future available buffer amount estimation value at a time of t+T, and the α is a weight ranging of 0<α≤1.

And also, the T is determined by a following equation 2, $$T = T1 + T2 + \delta \qquad \text{Equation 2,}$$

when the T1 is a time consumed for calculating the future available buffer amount estimation value by the calculation unit, the T2 is a time consumed for controlling the available buffer amount by the buffer amount control unit and the δ is a constant greater than 0.

And also, the calculation unit calculates the future available buffer amount estimation value by using a following equation 3, $$X_{t+T} = \alpha Y_t + (1-\alpha)X_t + (\lambda - W)T\delta \qquad \text{Equation 3,}$$

when the $Y_t$ is a real available buffer amount at a time t as a current time, the $X_{t+T}$ is a future available buffer amount estimation value at a time of t+T, the α is a weight ranging of 0<α≤1, the λ is a data receiving rate to be received to the transceiver unit and the W is an average data processing rate to process data by the Zigbee device.

And also, the T1 is determined by a following equation 2, $$T = T1 + T2 + \delta \qquad \text{Equation 2,}$$

when the T1 is a time consumed for calculating the future available buffer amount estimation value by the calculation unit, the T2 is a time consumed for controlling the available buffer amount by the buffer amount control unit and the δ is a constant greater than 0.

And also, the control unit further includes a CTS generation unit for generating an additional data-not-accepted signal to alarm that an additional data reception is impossible in case when the buffer amount control unit does not increase the available buffer amount; and the additional data-not-accepted signal generated in the CTS generation unit is broad-casted through the transceiver unit.

At this time, the additional data-not-accepted signal includes a not-accepted forecast time information.

At this time, the X is an exponential weighted moving average.

A method for management of a Zigbee device in accordance with the embodiment of the present invention includes: estimating a future available buffer amount; and controlling an available buffer amount in such a way that the available buffer amount is matched to the future available buffer amount.

At this time, estimating the future available buffer amount calculates the future available buffer amount estimation value by using a following equation 1, $$X_{t+T} = \alpha Y_t + (1-\alpha)X_t \qquad \text{Equation 1,}$$

when the $Y_t$ is a real variable buffer amount at t as a current time, the $X_{t+T}$ is a future available buffer amount estimation value at a time of t+T, and the α is a weight ranging of 0<α≤1.

And also, the T1 is determined by a following equation 2, $$T = T1 + T2 + \delta \qquad \text{Equation 2,}$$

when the T1 is a time consumed for calculating the future available buffer amount estimation value by the calculation unit, the T2 is a time consumed for controlling the available buffer amount by the buffer amount control unit and the δ is a constant greater than 0.

And also, estimating the future available buffer amount calculates the future available buffer amount estimation value by using a following equation 3, $$X_{t+T} = \alpha Y_t + (1-\alpha)X_t + (\lambda - W)T\delta \qquad \text{Equation 3,}$$

when the $Y_t$ is a real available buffer amount at a time t as a current time, the $X_{t+T}$ is a future available buffer amount estimation value at a time of t+T, the α is a weight ranging of 0<α≤1, the λ is a data receiving rate to be received to the transceiver unit and the W is an average data processing rate to process data by the Zigbee device.

And also, a method for management of a Zigbee device in accordance with the embodiment of the present invention further includes: in case when the available buffer amount is not increased any more, broadcasting an additional data-not-accepted signal to alarm that an additional data reception is impossible.

At this time, the additional data-not-accepted signal includes a not-accepted forecast time information.

And also, a method for management of a Zigbee device in accordance with the embodiment of the present invention further includes: after broadcasting the additional data not-accepted signal and after the not-accepted forecast time is passed, feeding-back to estimating the future available buffer amount.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 6 is a view explaining a relationship between RTS/CTS in accordance with another embodiment of the present invention;

FIG. 7 is an exemplary view showing an RTS frame format in accordance with one embodiment of the present invention;

FIG. 8 is an exemplary view showing a CTS frame format in accordance with one embodiment of the present invention;

FIG. 9 is an exemplary view schematically showing an operation method of the Zigbee device in accordance with one embodiment of the present invention; and FIG. 10 an exemplary view schematically showing an operation method of the Zigbee device in accordance with another embodiment of the present invention.

DETAILED DESCRIPTION OF THE PREFERABLE EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

The terms used throughout this specification are provided to describe embodiments but not intended to limit the present invention. In this specification, a singular form includes a plural form unless the context specifically mentions. When an element is referred to as "comprises" and/or "comprising", it does not preclude another component, step, operation and/or device, but may further include the other component, step, operation and/or device unless the context clearly indicates otherwise.

Hereinafter, the constructions of the present invention and function effects thereof will be described in detail with reference to the accompanying drawings.

Figure 1:
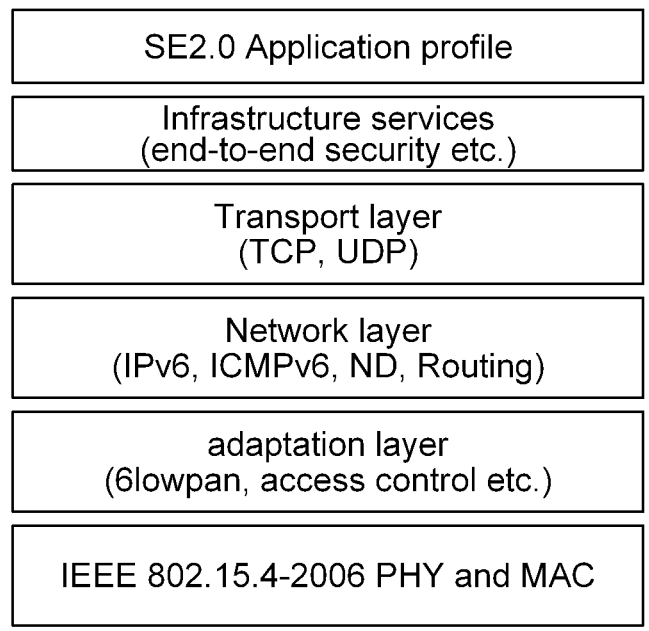
FIG. 1 is an exemplary view schematically showing a structure of a conventional Zigbee IP stack.
Figure 2:
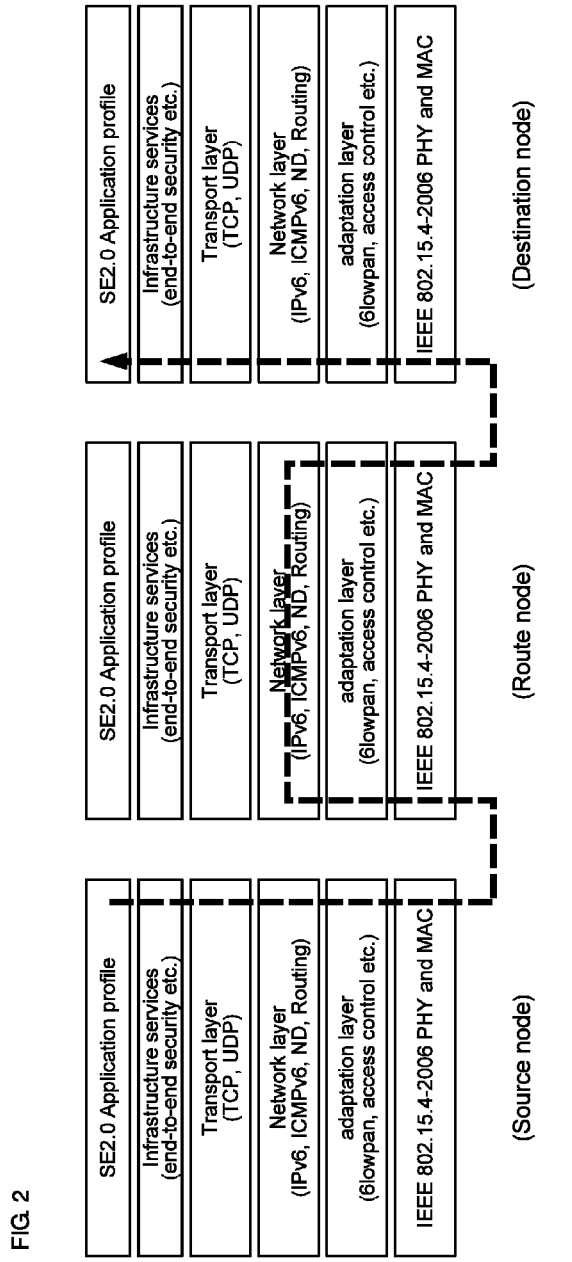
FIG. 2 is an exemplary diagram schematically showing a flow to process a data frame in the Zigbee IP stack.
Figure 3:
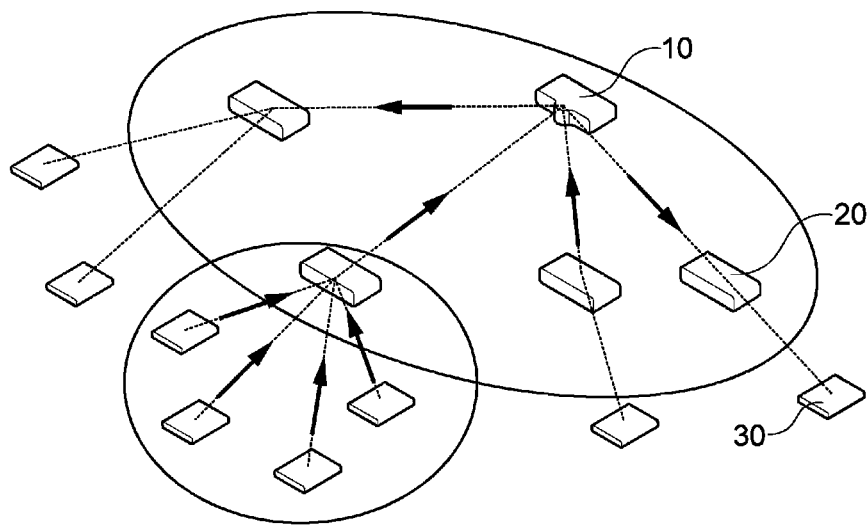
FIG. 3 is an exemplary view schematically showing a Zigbee IP network.
Figure 4:
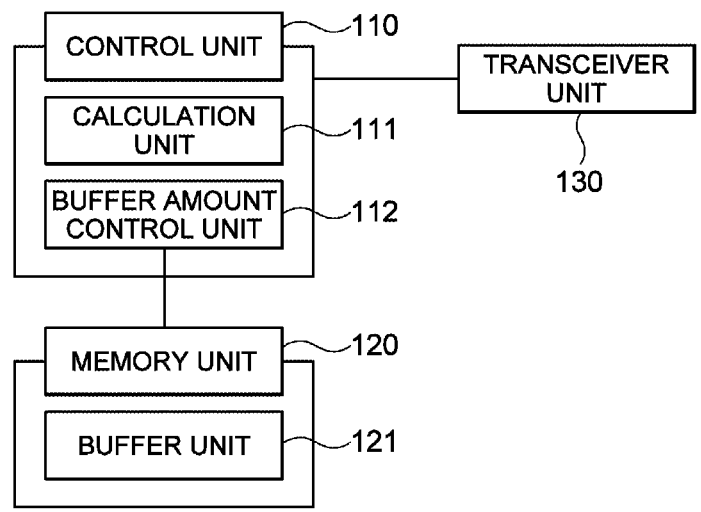
FIG. 4 is an exemplary view schematically showing a Zigbee device in accordance with one embodiment of the present invention.

FIG. 4 is an exemplary view schematically showing a Zigbee device in accordance with one embodiment of the present invention.

Referring to FIG. 4, the Zigbee device 100 in accordance with the present invention can include a transceiver unit 120, a memory unit 120, a buffer unit 121 and a control unit 110.

The transceiver unit 130 plays a role of transceiving data according to IEEE 802.15.4 standard.

The memory unit 120 stores the data and data to be stored or the received data is temporary stored in the buffer unit 121.

At this time, the buffer unit 121 may be formed by allowing one region of the memory unit 120 to be allocated.

The control unit 110 may perform a role of controlling an available buffer amount by including a calculation unit 111 to estimate a future available buffer amount and a buffer amount varying unit to control the available buffer amount according to the estimation value of the future available buffer amount and by estimating the future available buffer amount of the buffer unit 121.

At this time, the calculation unit 111 can calculate the future available buffer amount estimation value by using a following equation 1.

$$X_{t+T} = \alpha Y_t + (1-\alpha) X_t \qquad \text{Equation 1}$$

Herein, the symbols used in the equation 1 have the following means.

The $Y_t$ is a real variable buffer amount at t as a current time.

The $X_{t+T}$ is a future available buffer amount estimation value at a time of t+T.

The $\alpha$ is a weight ranging of $0 < \alpha \leq 1$.

At this time, the weight is a factor to determine whether the future available buffer amount can be estimated by giving more importance to anyone among a past available buffer amount and a current real available buffer amount.

For example, as the value of a becomes approximate to 0, the future available buffer amount can be estimated in such a way that the past available buffer amount which is previously derived is reflected on more importance.

On the contrary, as the value of a becomes approximate to 0, the future available buffer amount can be estimated approximate to the real available buffer amount.

Meanwhile, if T1 is a time consumed for calculating the future available buffer amount estimation value by the calculation unit 111, T2 is a time consumed for controlling the available buffer amount by the buffer amount control unit 112 and δ is a constant greater than 0, the T is determined by a following equation 2, $$T = T1 + T2 + \delta \qquad \text{Equation 2}$$

Herein, the δ is a factor to determine whether the variable buffer amount can be controlled by estimating the future available buffer amount after somewhat long time, since longer future available buffer amount is estimated as the δ becomes larger, the resource consumption to estimate the future available buffer amount can be minimized; on the contrary, since a network communication status changing from moment to moment cannot be sensitively reflected on, there is generated somewhat difference between the estimated future available buffer amount and the real required available buffer amount.

And also, at this time, the X is an exponential weighted moving average (EWMA).

If the EWMA is used, since the calculation process thereof is simple but the accuracy of estimation is high, the future available buffer amount reflecting on the past buffer amount can be estimated by inputting the minimum resource.

Figure 5:
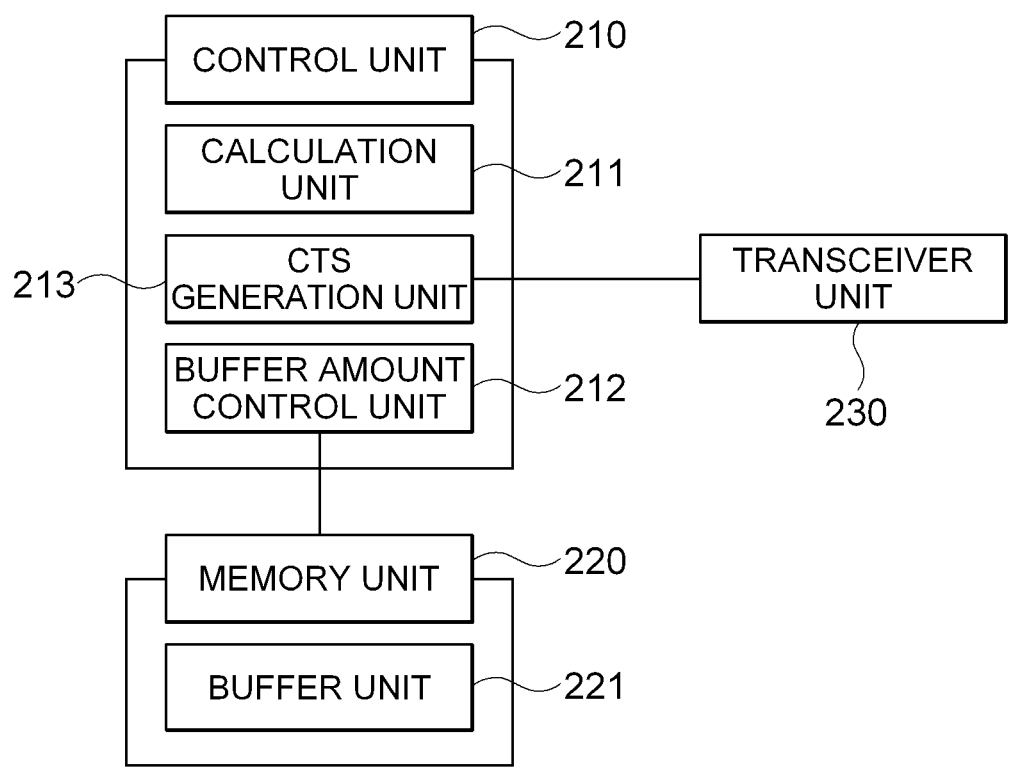
FIG. 5 is an exemplary view schematically showing a Zigbee device in accordance with another embodiment of the present invention.

FIG. 5 is an exemplary view schematically showing a Zigbee device 200 in accordance with another embodiment of the present invention.

Referring 5, the Zigbee device 200 in accordance with one embodiment of the present invention can further include a CTS generation unit 213.

For example, in case when the available buffer amount reaches the maximum limit to be increased, although the future available buffer amount estimation value is calculated however largely, the available buffer amount cannot be increased.

In this case, as the Zigbee device 200 performs broadcasting by generating an additional data-not-accepted signal which cannot process by receiving further data by oneself, it allows the other Zigbee devices to transmit data to a corresponding Zigbee device to wait or to transmit data to another Zigbee device as a destination node through another path.

Accordingly, a frame drop phenomenon existing in the conventional Zigbee network can be prevented.

FIG. 6 is a view explaining a relationship between RTS/CTS in accordance with another embodiment of the present invention, FIG. 7 is an exemplary view showing an RTS frame format in accordance with one embodiment of the present invention and FIG. 8 is an exemplary view showing a CTS frame format in accordance with one embodiment of the present invention.

Referring to FIG. 6 to FIG. 8, the Zigbee devices 200 can occupy order of priority in advance to the Zigbee devices where the data will be transmitted before the data is transmitted by transceiving the RTS and CTS from each other.

In the Zigbee transmitter in accordance with one embodiment of the present invention, duration information can be included in an RTS frame format. The duration information can include the time consumed in processing by receiving the data by the Zigbee receiver to be a receiving part.

And also, the Zigbee receiver to be the receiving part can generate the CTS including an additional data-not-accepted signal by considering on its own variable buffer amount.

And also, in the CTS, not-accepted forecast time information which means whether the not-accepted status will continue to some extent can be included.

At this time, referring to FIG. 6, the not-accepted forecast time can be derived from a remaining time which is obtained by subtracting 2*SIFS(Short Inter Frame Spacing) and the CTS from the duration information included in the RTS frame.

Accordingly, since the other Zigbee devices receiving the CTS signals can wait without transmitting data to the Zigbee receiver which broadcasts the CTS signals or bypass to another path, a frame drop phenomenon can be prevented.

FIG. 9 is an exemplary view schematically showing an operation method of the Zigbee device in accordance with one embodiment of the present invention.

Referring to FIG. 9, a method for management of a Zigbee device in accordance with one embodiment of the present invention can include: estimating a future available buffer amount S110; and controlling an available buffer amount in such a way that the available buffer amount is matched to the future available buffer amount S120.

And also, after the available buffer amount control is finished, the future available buffer amount estimation value can be estimated again after passing a predetermined time S130.

At this time, the predetermined time can be controlled by a factor represented by a symbol β, since the frequency to calculate the future available buffer amount estimation value is decreasing as the value of β becomes larger, the consumption of resources is reduced but the estimation accuracy and sensitivity can be reduced.

FIG. 10 an exemplary view schematically showing an operation method of the Zigbee device in accordance with another embodiment of the present invention.

Referring to FIG. 10, in case when further available buffer amount increment is impossible during the available buffer amount control S230, the frame drop phenomenon can be prevented by making the other Zigbee devices not to transmit additional data by transmitting the additional data-not-accepted signal S240.

At this time, in the additional data-not-accepted signal, the not-accepted forecast time information can be included; and, after the not-accepted forecast time is past after performing broadcast, the future available buffer amount estimation value can be calculated again S241.

Accordingly, the applicability of resource can be improved by variably using the buffer and the frame drop phenomenon can be minimized by using a medium access method even when the buffer variation is difficult anymore.

A Zigbee device and a method for management of a Zigbee device in accordance with one embodiment of the present invention constructed the above-description provide useful effects capable of improving data processing efficiency as well as improving resource utilization by varying the size of buffers under the condition that the size of memory is fixed.

And also, before reaching the maximum variable size which the buffer is varied in size, the frame drop phenomenon can be prevented by transmitting information to another terminal by the forecast information.

This invention may be embodied in different forms and should not be construed as limited to the embodiments set forth herein. Rather, these embodiments are provided so that this disclosure will be thorough and complete, and will fully convey the scope of the invention to those skilled in the art. As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A Zigbee device comprising:
a transceiver unit to transmit and receive data;
a memory unit for storing the data;
a buffer unit, which is one region of the memory unit, to store the data to be transmitted or the data to be received; and
a control unit to estimate a future available buffer amount of the buffer unit and to control an available buffer amount in such a way that the available buffer amount of the buffer unit is matched to the future available buffer amount,
the control unit including
a calculation unit to estimate the future available buffer amount of the buffer unit, and
a buffer amount control unit to control the available buffer amount in such a way that the available buffer amount of the buffer unit is matched to the future available buffer amount,
wherein the calculation unit calculates the estimated future available buffer amount by using a following equation 1, $$X_{t+T} = \alpha Y_t + (1-\alpha)X_t \qquad \text{Equation 1,}$$

the $Y_t$ is a real available buffer amount at a time t which is a current time, the $X_{t+T}$ is a future available buffer amount estimated value at a time of t+T, and the $\alpha$ is a weight ranging of $0<\alpha\leq 1$.

2. The Zigbee device according to claim 1, wherein the T is determined by a following equation 2, $$T = T1 + T2 + \delta \qquad \text{Equation 2,}$$

wherein the T1 is a time consumed to calculate the estimate future available buffer amount of the calculation unit, the T2 is a time consumed to control the available buffer amount by the buffer amount control unit, and the δ is a constant greater than 0.

3. A Zigbee device comprising:
a transceiver unit to transmit and receive data;
a memory unit to store the data;
a buffer unit, which is one region of the memory unit, to store the data to be transmitted or the data to be received; and
a control unit to estimate a future available buffer amount of the buffer unit and to control an available buffer amount in such a way that the available buffer amount of the buffer unit is matched to the future available buffer amount,
the control unit including
a calculation unit to estimate the future available buffer amount of the buffer unit, and
a buffer amount control unit to control the available buffer amount in such a way that the available buffer amount of the buffer unit is matched to the future available buffer amount,
wherein the calculation unit calculates the future available buffer amount estimation value by using a following equation 3, $$X_{t+T} = \alpha Y_t + (1-\alpha)X_t + (\lambda - W)T\delta \qquad \text{Equation 3,}$$

the $Y_t$ is a real available buffer amount at a time t which is a current time, the $X_{t+T}$ is a future available buffer amount estimation value at a time of t+T, the $\alpha$ is a weight ranging of $0<\alpha\leq 1$, the $\lambda$ is a data receiving rate to be received by the transceiver unit, and the W is an average data processing rate to process data by the Zigbee device.

4. The Zigbee device according to claim 3, wherein the T1 is determined by a following equation 2, $$T = T1 + T2 + \delta \qquad \text{Equation 2,}$$

wherein the T1 is a time consumed to calculate the future available buffer amount estimation value by the calculation unit, the T2 is a time consumed to control the available buffer amount by the buffer amount control unit, and the δ is a constant greater than 0.

5. The Zigbee device according to claim 1,
wherein the control unit further includes a CTS generation unit to generate an additional data-not-accepted signal to alarm that an additional data reception is impossible in a case when the buffer amount control unit does not increase the available buffer amount, and wherein the additional data-not-accepted signal generated in the CTS generation unit is broadcast through the transceiver unit.

6. The Zigbee device according to claim 5, wherein the additional data-not-accepted signal includes a not-accepted forecast time information.

7. The Zigbee device according to claim 1, wherein the X is an exponential weighted moving average.

8. A method for management of a Zigbee device comprising:
estimating a future available buffer amount; and
controlling an available buffer amount in such a way that the available buffer amount is matched to the future available buffer amount,
wherein the estimating of the future available buffer amount calculates the future available buffer amount estimation value by using a following equation 1, $$X_{t+T}=\alpha Y_t+(1-\alpha)X_t \qquad \text{Equation 1,}$$

the $Y_t$ is a real available buffer amount at a time t which is a current time, the $X_{t+T}$ is a future available buffer amount estimation value at a time of t+T, and the $\alpha$ is a weight ranging of $0<\alpha\leq1$.

9. The method according to claim 8,
wherein the T1 is determined by a following equation 2, $$T=T1+T2+\delta \qquad \text{Equation 2,}$$

wherein the T1 is a time consumed for calculating the future available buffer amount estimation value by the calculation unit, the T2 is a time consumed for controlling the available buffer amount by the buffer amount control unit, and the $\delta$ is a constant greater than 0.

10. A method for management of a Zigbee device comprising:
estimating a future available buffer amount; and
controlling an available buffer amount in such a way that the available buffer amount is matched to the future available buffer amount,
wherein the estimating of the future available buffer amount calculates the future available buffer amount estimation value by using a following equation 3, $$X_{t+T}=\alpha Y_t+(1-\alpha)X_t+(\lambda-W)T\delta \qquad \text{Equation 3,}$$

the $Y_t$ is a real available buffer amount at a time t which is as a current time, the $X_{t+T}$ is a future available buffer amount estimation value at a time of t+T, the $\alpha$ is a weight ranging of $0<\alpha\leq1$, the $\lambda$ is a data receiving rate to be received to the transceiver unit, and the W is an average data processing rate to process data by the Zigbee device.

11. The method according to claim 10,
wherein the T1 is determined by a following equation 2, $$T=T1+T2+\delta \qquad \text{Equation 2,}$$

wherein the T1 is a time consumed for calculating the future available buffer amount estimation value by the calculation unit, the T2 is a time consumed for controlling the available buffer amount by the buffer amount control unit and the $\delta$ is a constant greater than 0.

12. The method according to claim 8, further comprising, in case when the available buffer amount is not increased any more, broadcasting an additional data-not-accepted signal to alarm that an additional data reception is impossible.

13. The method according to claim 12, wherein the additional data-not-accepted signal includes a not-accepted forecast time information.

14. The method according to claim 13, further comprising, after broadcasting the additional data-not-accepted signal and after the not-accepted forecast time is passed, feeding-back to estimating the future available buffer amount.

15. The method according to claim 8, wherein the X is an exponential weighted moving average.

16. The Zigbee device according to claim 3, wherein the X is an exponential weighted moving average.

17. The method according to claim 10, wherein the X is an exponential weighted moving average.

* * * * *

UNITED STATES PATENT AND TRADEMARK OFFICE
CERTIFICATE OF CORRECTION

| | | |
|---|---|---|
| PATENT NO. | : 8,929,836 B2 | Page 1 of 1 |
| APPLICATION NO. | : 13/606316 | |
| DATED | : January 6, 2015 | |
| INVENTOR(S) | : Yoon | |

It is certified that error appears in the above-identified patent and that said Letters Patent is hereby corrected as shown below:

In the Claims

Column 7, line 56, Claim 1, delete "for storing" and insert -- to store --, therefor.
Column 8, line 11, Claim 1, delete "estimated" and insert -- estimation --, therefor.
Column 8, line 18, Claim 2, delete "estimate" and insert -- estimated --, therefor.
Column 10, line 6, Claim 10, delete "as a" and insert -- a --, therefor.

Signed and Sealed this
Thirtieth Day of June, 2015

Michelle K. Lee
*Director of the United States Patent and Trademark Office*